Patented Sept. 1, 1925.

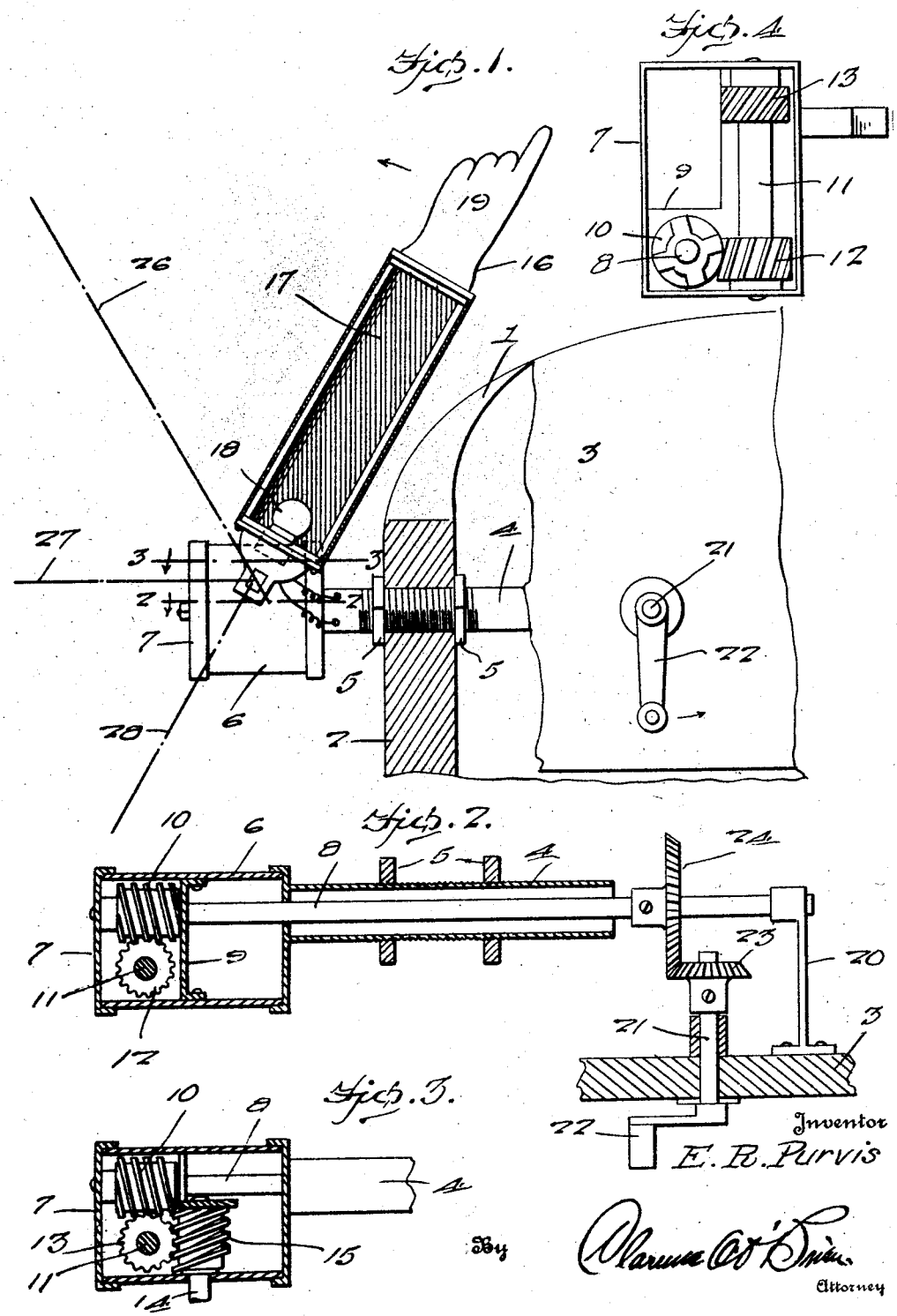

1,552,231

UNITED STATES PATENT OFFICE.

EDWARD R. PURVIS, OF SHREVEPORT, LOUISIANA.

AUTOMOBILE SIGNALING DEVICE.

Application filed March 10, 1925. Serial No. 14,481.

*To all whom it may concern:*

Be it known that I, EDWARD R. PURVIS, a citizen of the United States, residing at Shreveport, in the parish of Caddo and State of Louisiana, have invented certain new and useful Improvements in an Automobile Signaling Device, of which the following is a specification.

The present invention relates to an automobile signaling device and has for one of its important objects the provision of a signal adapted for ready adjustment by the driver of a vehicle for denoting to the public the intended future course of traveling of the automobile, the device being visible at night as well as the daytime.

A further object of the invention is the provision of signals carried by the vehicle adapted for operation by the driver whereby a right or left hand turn, or a stop is readily indicated for the advisement of persons in advance, or at the rear of the automobile, the device being operable by means of a single member conveniently located adjacent the driver's seat.

Another very important object of the invention is to provide a signal of this nature which may be readily operated to different signaling positions and which will remain in the signaling except when moved by the regular operating means.

A still further object of the invention is to provide a signaling device of this nature which is simple and efficient in construction, reliable in operation, inexpensive to manufacture and install, attractive in appearance, not liable to readily get out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing

Figure 1 is a detail sectional view through a portion of an automobile body showing my improved signaling device mounted thereon, Fig. 2 is a section taken substantially on the line 2—2 of Fig. 1, looking in the direction of the arrow, Fig. 3 is another detail section taken substantially on the line 3—3 of Fig. 1 looking in the direction of the arrow, and Fig. 4 is an end elevation of the gear casing with the cover plate removed.

Referring to the drawing in detail, it will be seen that 1 designates generally the body of an automobile and 2 the left hand side thereof adjacent the instrument board 3. A tubular member 4 extends transversely of the automobile body through the left hand side 2 being held in place by a pair of nuts 5 and disposed forwardly of the instrument board 3.

A gear housing 6 is mounted on the end of the tube and is closed at its front end by the plate 7. A shaft 8 extends through the tube 4 and is journaled in the housing 6 through a suitable partition or the like 9 and has mounted at its end within the housing 6 a worm 10. A shaft 11 is journaled vertically in the housing 6 and is best shown in Fig. 4, and has on its ends a worm gear 12 and a spiral gear 13. The worm gear 12 is in mesh with the worm 10. A signal shaft 14 has a spiral 15 mounted thereon within the casing, this shaft 14 being journaled to extend in the casing and terminate exteriorly thereof.

The spiral 15 meshes with the spiral 13 so as to be driven thereby. A signal arm 16 is provided on the outer end of the shaft 14 to be swung thereby. This signal arm 16 includes a transparent casing 17, the transparency thereof preferably being red and houses an incandescent electric bulb 18. At the end of the casing there is mounted a member 19 simulating a hand.

The end of the shaft 8 terminating forwardly of the instrument board 3 is journaled in a bracket 20 mounted on the instrument board 3. A shaft 21 is journaled through the instrument board 3 and on its rear end is provided with a crank 22 or other suitable operating means. A beveled gear 23 is keyed to this shaft 21 and meshes with a beveled gear 24 on the shaft 8. Thus by turning the crank 22, the single arm 16 may be placed in its inactive position as shown in Fig. 1 or moved to position for indicating a right hand turn such as is designated by the line 26, or to the position indicated by the line 27 for indicating a left hand turn or the position designated by the line 28 indicating that the vehicle is about to stop.

By the provision of the worm 10 and worm gear 12, it will be seen that the signal arm may be operated from the driver's seat by actuation of the crank or the like 22, but it will be impossible to move the signal arm by placing the hand directly thereon and it will also be evident that after this signal arm has been placed in any of the desired positions it will remain in that position and will not be jolted to any other position or in other words it can only be used when the worm 10 is rotated through the medium of the shaft 8, beveled gears 24 and 23 and shaft 21 by the operator grasping the crank 22 or like device.

It is thought that the construction, operation and advantages of this invention will now be clearly understood without a more detailed description thereof. It is desired, however, to point out that the signal is simple in construction and will be attractive in appearance.

It is apparent that the present embodiment of the invention has been disclosed in detail merely by way of example and that numerous changes in the details of construction, and in the combination and arrangement of parts may be resorted to without departing from the spirit or scope of the invention as hereinafter claimed or sacrificing any of its advantages.

Having thus described my invention, what I claim as new is:—

In a signal of the class described, a tube, means for mounting the tube on a vehicle, a casing on the outer end of the tube, a shaft extending through the tube into the casing, means for operating the shaft, a worm on the shaft within the casing, a second shaft journaled in the casing, a worm gear on the second shaft meshing with the worm, a spiral gear on the second shaft, a third shaft journaled in the casing, a spiral on the third shaft meshing with aforementioned spiral, and signal arm on the third shaft exteriorly of the casing.

In testimony whereof I affix my signature.

EDWARD R. PURVIS.